US012668514B2

(12) United States Patent  (10) Patent No.:  US 12,668,514 B2
Mu et al.  (45) Date of Patent:  Jun. 30, 2026

(54) SEAWATER DESALINATION SYSTEM AND RESOURCEZATION SYSTEM

(71) Applicant: ZIBO GERUI WATER TREATMENT ENGINEERING CO., LTD., Zibo (CN)

(72) Inventors: Shichen Mu, Zibo (CN); Xiang Hao, Zibo (CN); Shuo Nan, Zibo (CN); Yifan Mu, Zibo (CN)

(73) Assignee: ZIBO GERUI WATER TREATMENT ENGINEERING CO., LTD., Zibo (CN)

( * ) Notice: Subject to any disclaimer, the term of this patent is extended or adjusted under 35 U.S.C. 154(b) by 428 days.

(21) Appl. No.: 18/473,311

(22) Filed: Sep. 25, 2023

(65) Prior Publication Data

US 2025/0011195 A1  Jan. 9, 2025

(30) Foreign Application Priority Data

Jul. 3, 2023  (CN) .......................... 202310800280.3

(51) Int. Cl.
*B01D 65/02*  (2006.01)
*C01D 3/06*  (2006.01)
(Continued)

(52) U.S. Cl.
CPC .............. *C02F 1/442* (2013.01); *B01D 65/02* (2013.01); *C01D 3/06* (2013.01); *C01D 5/00* (2013.01);
(Continued)

(58) Field of Classification Search
CPC .. C02F 1/442; C02F 1/04; C02F 1/441; C02F 1/444; C02F 2103/08; C02F 2301/08; C02F 2303/10; B01D 65/02; C01D 3/06; C01D 5/00; C01F 11/46; C01P 2006/80; Y02A 20/131
(Continued)

(56) References Cited

U.S. PATENT DOCUMENTS

2003/0205526 A1* 11/2003 Vuong ............... B01D 61/0271
210/651
2024/0198288 A1* 6/2024 Wallace ................. C01B 17/74

FOREIGN PATENT DOCUMENTS

CN  206014468 U  * 3/2017
CN  115259418 A  * 11/2022  .............. C02F 1/441
IT  102019000016661 B1 * 9/2021

OTHER PUBLICATIONS

Machine-generated English translation of CN 115259418, generated on Jan. 6, 2026.*
(Continued)

*Primary Examiner* — Fred Prince

(57) ABSTRACT

The present invention discloses a seawater desalination system and resourcezation system. The seawater desalination system comprises a raw water tank, a seawater pretreatment device, a seawater desalination device, a desalination water tank and a nanofiltration recovery device; The resourcezation system comprises the seawater desalination system, a salt separation nanofiltration device, a univalent concentrated brine tank and a bivalent concentrated brine tank; The present invention realizes seawater desalination and concentrated water resourcezation treatment for seawater, and at the same time, can reduce the operating pressure, reduce the cost and save energy consumption.

7 Claims, 6 Drawing Sheets

(51) Int. Cl.

| | |
|---|---|
| *C01D 5/00* | (2006.01) |
| *C01F 11/46* | (2006.01) |
| *C02F 1/04* | (2023.01) |
| *C02F 1/44* | (2023.01) |
| *C02F 103/08* | (2006.01) |

(52) U.S. Cl.

CPC ................ *C01F 11/46* (2013.01); *C02F 1/04* (2013.01); *C02F 1/441* (2013.01); *C02F 1/444* (2013.01); *C01P 2006/80* (2013.01); *C02F 2103/08* (2013.01); *C02F 2301/08* (2013.01); *C02F 2303/10* (2013.01); *Y02A 20/131* (2018.01)

(58) Field of Classification Search

USPC ........................................ 210/652, 252, 259

See application file for complete search history.

(56) References Cited

OTHER PUBLICATIONS

Machine-generated English translation of CN 206014468, generated on Jan. 6, 2026.*

Machine-generated English translation of IT 10201900001661, generated on Jan. 6, 2026.*

\* cited by examiner

SEAWATER DESALINATION SYSTEM AND RESOURCEZATION SYSTEM

TECHNICAL FIELD

The present invention relates to the technical field of seawater desalination treatment, in particular to a seawater desalination system and resourcezation system.

BACKGROUND

At present, fresh water resources are increasingly scarce and the demands for fresh water are continuously increased. As one of the important strategic means to solve the shortage of the fresh water resources, seawater desalination has broad development prospects.

In numerous seawater desalination technologies, multi-stage flash evaporation, low-temperature multi-effect treatment and reverse osmosis membrane method are the three main technologies, wherein the reverse osmosis membrane method is a method that allows seawater to flow through one side of a semipermeable membrane under the effect of pressure higher than osmotic pressure and obtains fresh water on the other side of the membrane. This method is an advanced, stable and effective salt removal technology at present.

However, the existing moderate and small seawater desalination systems for islands and ships are generally operated at a pressure of 5.5-8 MPa, that is, a high-pressure reverse osmosis membrane method is used for seawater desalination or an electrodialysis method is used for desalting water. However, the high-pressure seawater desalination system is complex, requires the configuration of seawater desalination high-pressure pumps and energy recovery devices, and has high price and high maintenance cost. The electrodialysis method has high energy consumption. At the same time, concentrated brine for seawater desalination has a great impact on the ecological environment.

Therefore, a problem to be urgently solved by those skilled in the art is to provide a low-pressure and energy-saving seawater desalination system and a resourcezation system.

SUMMARY

In view of this, the present invention provides a seawater desalination system and resourcezation system, which can reduce the operating pressure, reduce the cost and save energy consumption.

In order to achieve the above purpose, the present invention adopts the following technical solution:

A seawater desalination system comprises a seawater replenishment pipeline, a raw water tank, a seawater pretreatment device, a seawater desalination device, a desalination water tank and a nanofiltration recovery device; the raw water tank, the seawater pretreatment device, the seawater desalination device and the desalination water tank are successively connected through a pipeline from left to right; the seawater desalination device is connected with the nanofiltration recovery device through a pipeline; the desalination water tank is connected with the nanofiltration recovery device through a pipeline, and the connecting pipeline between the desalination water tank and the nanofiltration recovery device is provided with an electric flushing water inlet valve; and the nanofiltration recovery device is connected with the raw water tank through a pipeline.

By adopting the above technical solution, the present invention has the beneficial effects:

Seawater desalination is realized, the operating pressure can also be reduced, the cost is reduced and energy consumption is saved.

Further, the connecting pipeline between the raw water tank and the seawater pretreatment device is provided with a booster pump, and the connecting pipeline between the seawater pretreatment device and the seawater desalination device is provided with a variable frequency medium pressure pump.

A seawater resourcezation system comprises the above seawater desalination system, a salt separation nanofiltration device, a univalent concentrated brine tank and a bivalent concentrated brine tank; the salt separation nanofiltration device is connected with the nanofiltration recovery device through a pipeline, and the salt separation nanofiltration device is connected with the desalination water tank through a pipeline; and the univalent concentrated brine tank and the bivalent concentrated brine tank are connected with the salt separation nanofiltration device through a pipeline respectively.

By adopting the above technical solution, the present invention has the beneficial effects:

Seawater desalination and concentrated water resourcezation treatment for seawater are achieved, energy is fully utilized, and at the same time, the operating pressure can be reduced, the cost is reduced and energy consumption is saved.

Further, the seawater desalination device comprises a first voltage-stabilized energy recovery device, a first circulating booster pump and a seawater desalination membrane block which are connected successively from left to right through a pipeline; the first voltage-stabilized energy recovery device is connected with the variable frequency medium pressure pump through a pipeline; the seawater desalination membrane block is connected with the desalination water tank through a pipeline; a first flushing pipe is installed on the first voltage-stabilized energy recovery device, and a first return regulating valve and a first electric flushing valve are installed successively on the first flushing pipe from left to right; the seawater desalination membrane block is connected with the nanofiltration recovery device through a pipeline, and the connecting pipeline between the seawater desalination membrane block and the nanofiltration recovery device is provided with a first concentrated water regulating valve.

Further, the nanofiltration recovery device comprises a nanofiltration membrane block, a second circulating booster pump and a second voltage-stabilized energy recovery device which are connected successively from left to right through a pipeline; the nanofiltration membrane block is connected with the raw water tank through a pipeline; the second voltage-stabilized energy recovery device is connected with the desalination water tank through a first flushing water inlet pipe; the first flushing water inlet pipe is provided with a first electric flushing water inlet valve; a second flushing pipe is installed on the second voltage-stabilized energy recovery device, and a second electric flushing valve and a second return regulating valve are installed on the second flushing pipe successively from left to right; the seawater desalination membrane block is connected with the second voltage-stabilized energy recovery device through a pipeline; an extension pipe is installed on the nanofiltration membrane block; and a second concentrated water regulating valve is installed on the extension pipe.

Further, the salt separation nanofiltration device comprises a third voltage-stabilized energy recovery device, a third circulating booster pump and a salt separation nanofiltration membrane block which are connected successively from left to right through a pipeline; the third voltage-stabilized energy recovery device is connected with the nanofiltration membrane block through the extension pipe; the connecting pipeline between the third voltage-stabilized energy recovery device and the third circulating booster pump is connected with the first flushing water inlet pipe through a second flushing water inlet pipe; the second flushing water inlet pipe is provided with a second electric flushing water inlet valve; a third flushing pipe is installed on the third voltage-stabilized energy recovery device, and a third return regulating valve and a third electric flushing valve are installed on the third flushing pipe successively from left to right; the univalent concentrated brine tank and the bivalent concentrated brine tank are connected with the salt separation nanofiltration membrane block respectively through a pipeline, and a third concentrated water regulating valve is installed on the connecting pipeline between the bivalent concentrated brine tank and the salt separation nanofiltration membrane block.

Further, the salt separation nanofiltration device comprises a preliminary concentrated salt separation nanofiltration device and a deep concentrated salt separation nanofiltration device.

The preliminary concentrated salt separation nanofiltration device comprises a third voltage-stabilized energy recovery device, a third circulating booster pump and a first salt separation nanofiltration membrane block which are connected successively from left to right through a pipeline; the third voltage-stabilized energy recovery device is connected with the nanofiltration membrane block through the extension pipe; the connecting pipeline between the third voltage-stabilized energy recovery device and the third circulating booster pump is connected with the first flushing water inlet pipe through the second flushing water inlet pipe; the second flushing water inlet pipe is provided with the second electric flushing water inlet valve; a third flushing pipe is installed on the third voltage-stabilized energy recovery device, and a third return regulating valve and a third electric flushing valve are installed on the third flushing pipe successively from left to right; and the univalent concentrated brine tank is connected with the first salt separation nanofiltration membrane block through a pipeline.

The deep concentrated salt separation nanofiltration device comprises a fourth voltage-stabilized energy recovery device, a fourth circulating booster pump and a second salt separation nanofiltration membrane block which are connected successively from left to right through a pipeline; the fourth voltage-stabilized energy recovery device is connected with the first salt separation nanofiltration membrane block through a pipeline; the third concentrated water regulating valve is installed on the connecting pipeline between the fourth voltage-stabilized energy recovery device and the first salt separation nanofiltration membrane block; the connecting pipeline between the fourth voltage-stabilized energy recovery device and the fourth circulating booster pump is connected with the second flushing water inlet pipe through the third flushing water inlet pipe; the third flushing water inlet pipe is provided with a third electric flushing water inlet valve; a fourth flushing pipe is installed on the fourth voltage-stabilized energy recovery device, and a fourth return regulating valve and a fourth electric flushing valve are installed on the fourth flushing pipe successively from left to right; the univalent concentrated brine tank and the bivalent concentrated brine tank are connected with the second salt separation nanofiltration membrane block respectively through a pipeline, and a fourth concentrated water regulating valve is installed on the connecting pipeline between the bivalent concentrated brine tank and the second salt separation nanofiltration membrane block.

The beneficial effect of adopting the above further technical solution is further resourcezation treatment.

Further, the seawater desalination device comprises a first seawater desalination membrane block, a second seawater desalination membrane block and the first voltage-stabilized energy recovery device; the first seawater desalination membrane block and the second seawater desalination membrane block are connected through a pipeline; the first seawater desalination membrane block is connected with the variable frequency medium pressure pump through a pipeline; the first seawater desalination membrane block and the second seawater desalination membrane block are connected with the first voltage-stabilized energy recovery device through a pipeline, and the first seawater desalination membrane block and the second seawater desalination membrane block are connected with the desalination water tank through a pipeline; the first flushing pipe is installed on the first voltage-stabilized energy recovery device, and a first circulating booster pump and a first electric flushing valve are installed on the first flushing pipe successively from left to right; the second seawater desalination membrane block is connected with the nanofiltration recovery device through a pipeline, and the connecting pipeline between the second seawater desalination membrane block and the nanofiltration recovery device is provided with the first concentrated water regulating valve.

Further, the seawater resourcezation system further comprises a low desalination nanofiltration concentration recovery device.

The low desalination nanofiltration concentration recovery device comprises a low desalination nanofiltration membrane block, a third circulating booster pump and a third voltage-stabilized energy recovery device which are connected successively from left to right through a pipeline, and the third voltage-stabilized energy recovery device is connected with the nanofiltration membrane block through the extension pipe; the third voltage-stabilized energy recovery device is connected with the desalination water tank through the second flushing water inlet pipe, and the second flushing water inlet pipe is communicated with the first flushing water inlet pipe; the second flushing water inlet pipe is provided with the second electric flushing water inlet valve; the third flushing pipe is installed on the third voltage-stabilized energy recovery device, and the third electric flushing valve and the third return regulating valve are installed on the third flushing pipe successively from left to right; and the low desalination nanofiltration membrane block is connected with the raw water tank through a pipeline.

The salt separation nanofiltration device comprises the fourth voltage-stabilized energy recovery device, the fourth circulating booster pump and the salt separation nanofiltration membrane block which are connected successively from left to right through a pipeline; the fourth voltage-stabilized energy recovery device is connected with the low desalination nanofiltration membrane block through a pipeline, and the connecting pipeline between the fourth voltage-stabilized energy recovery device and the low desalination nanofiltration membrane block is provided with the third concentrated water regulating valve; the connecting pipeline between the fourth voltage-stabilized energy recovery device and the fourth circulating booster pump is connected with the second flushing water inlet pipe through the third flushing water inlet pipe; the third flushing water inlet pipe is provided with the third electric flushing water inlet valve; the fourth flushing pipe is installed on the fourth voltage-stabilized energy recovery device, and a fourth return regulating valve and a fourth electric flushing valve are installed on the fourth flushing pipe successively from left to right; the univalent concentrated brine tank and the bivalent concentrated brine tank are connected with the salt separation nanofiltration membrane block respectively through a pipeline, and the fourth concentrated water regulating valve is installed on the connecting pipeline between the bivalent concentrated brine tank and the salt separation nanofiltration membrane block.

It can be seen that the present invention provides a seawater desalination system and resourcezation system, and compared with the prior art, the present invention has the following beneficial effects:

1) The concentrated water regulating valves and the circulating booster pumps are matched to control a concentrated water end and a water inlet end of each circulating pipeline to circulate and control the flow rate of a membrane concentrated water side, so that when concentrated water flows through a concentrated water channel, a plurality of turbulent vortices are formed. The shear forces of the turbulent vortices make a membrane surface always smooth, thereby reducing the membrane pollution, and the turbulent periphery has fewer impurities and low salt content, so the osmotic pressure is low so that the operating pressure of a membrane element is reduced. At the same time, the turbulence produces a component velocity perpendicular to a flow direction, which acts vertically on the membrane surface, making the desalted water more easily permeable, thereby further reducing the operating pressure.

2) Through the nanofiltration recovery device, the produced water is returned to the raw water tank and mixed with seawater in a certain proportion (such as: 1:2), to reduce the salt content of raw water (after the replenished seawater is mixed with the produced water from nanofiltration, the salt content of the mixed water is more than 20000 mg/l, and the salt content of seawater is calculated according to 30000 mg/l), thereby reducing the osmotic pressure of seawater desalination and achieving the purpose of reducing the operating pressure of seawater desalination membrane block; and meanwhile, the calcium and magnesium content is reduced after the replenished seawater is mixed with the produced water from nanofiltration, and the scaling tendency of the system membrane is reduced.

3) Firstly, the present invention uses the potential energy at the concentrated water end of the sea desalination device to achieve the purpose of energy saving through the nanofiltration recovery device; and secondly, the produced water of the nanofiltration recovery device is to returned to the raw water tank and mixed with seawater in a certain proportion (such as: 1:2), to reduce the salt content of the raw water (after the replenished seawater is mixed with the produced water from nanofiltration, the salt content of the mixed water is more than 20000 mg/l, and the salt content of seawater is calculated according to 30000 mg/l), thereby reducing the osmotic pressure of seawater desalination and achieving the purpose of reducing the operating pressure of seawater desalination membrane block; and meanwhile, the calcium and magnesium content is reduced after the replenished seawater is mixed with the produced water from nanofiltration; the scaling tendency of the system membrane is reduced; and the recovery rate (which is more than 50%) of seawater desalination is increased under low pressure conditions.

4) The present invention uses the potential energy at the concentrated water end of the sea desalination device through the nanofiltration recovery device; the first salt separation nanofiltration recovery device uses the potential energy at the concentrated water end of the nanofiltration recovery device; the second salt separation nanofiltration recovery device uses the potential energy at the concentrated water end of the first salt separation nanofiltration recovery device; and the energy saving of the resourcezation system is realized through the full utilization of the residual potential energy.

5) Through a design solution of large flow in the membrane, the present invention avoids the increase of the osmotic pressure caused by concentration polarization due to salt ion aggregation on the membrane surface, and at the same time, the flow velocity of water on the membrane surface is increased (the flow velocity of water on the membrane surface is controlled at 0.15-0.25 m/s), which can improve the desalination rate of the membrane and the flux of the membrane (water yield per unit area), thereby reducing the operating pressure to a certain extent, saving the cost of investment and increasing the removal rate of boron.

6) Energy recycling can be realized through the voltage-stabilized energy recovery devices to achieve the purpose of energy saving.

7) The problems of membrane contamination and membrane scaling are solved by the arrangement of the flushing pipelines, the membrane flux is maintained, and the membrane life is prolonged.

In conclusion, through the above process synergy, the operating pressure of the system is controlled at 2.5-3.5 MPa (the operating pressure is different in different implementation cases, and the corresponding implementation cases are selected according to water quality and customer requirements), to achieve the purpose of reducing energy consumption and improve the utilization rate of seawater; and at the same time, the concentrated brine realizes the purpose of univalent and bivalent salt resourcezation through salt separation concentration.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solutions in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

Figure 1:
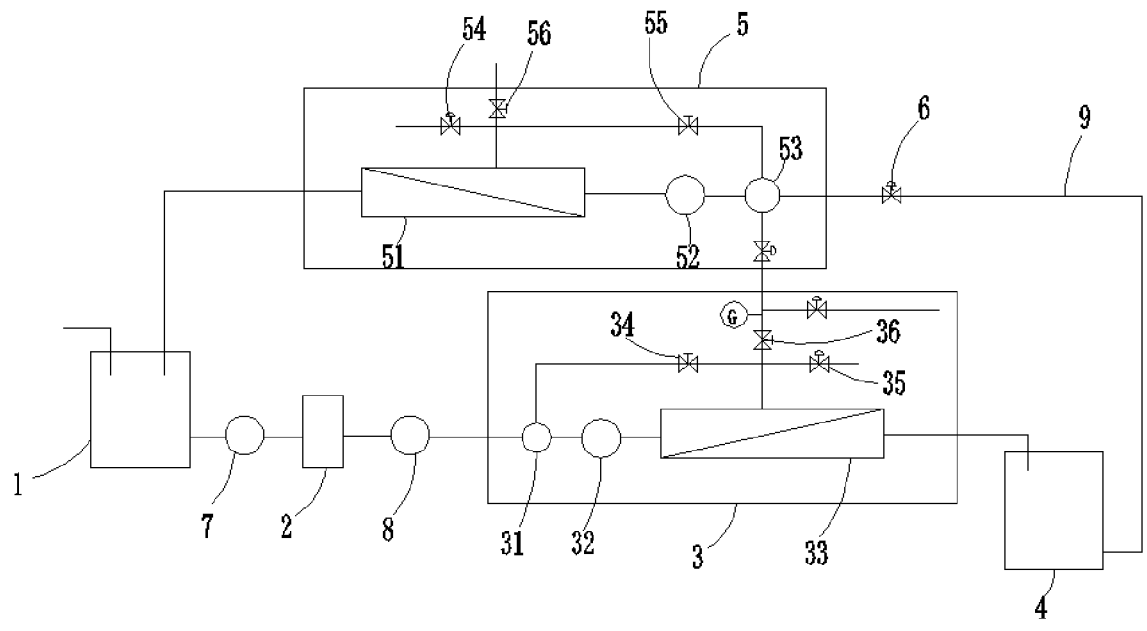
FIG. 1 is a structural schematic diagram of a seawater desalination system provided in embodiment 1 of the present invention.
Figure 6:
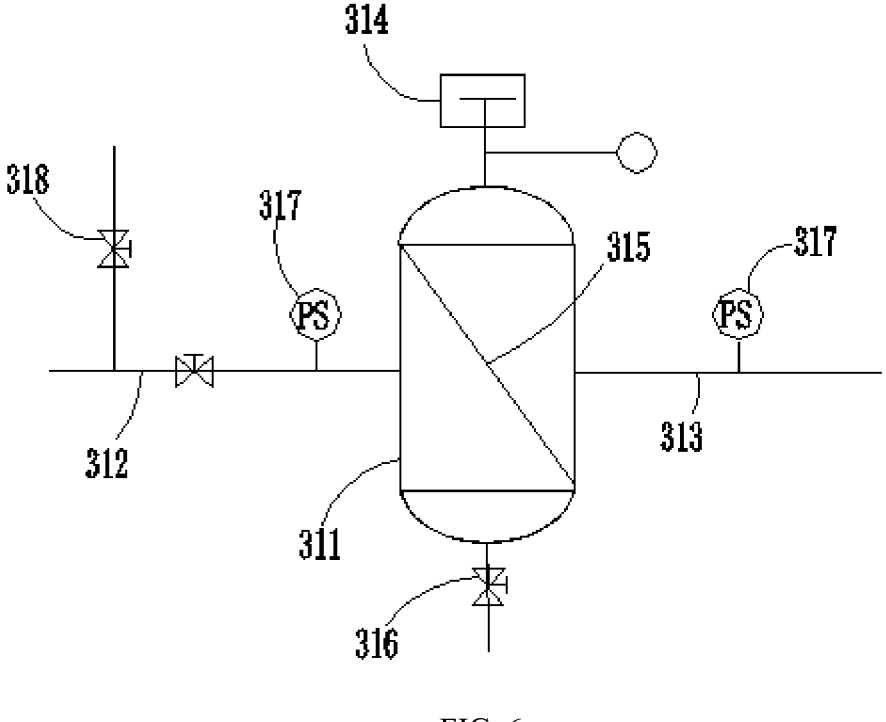
FIG. 6 is a structural schematic diagram of a first voltage-stabilized energy recovery device provided in the present invention.

As shown in FIGS. 1 and 6, an embodiment of the present invention discloses a seawater desalination system which comprises a raw water tank 1, a seawater pretreatment device 2, a seawater desalination device 3, a desalination water tank 4 and a nanofiltration recovery device 5. The raw water tank 1, the seawater pretreatment device 2, the seawater desalination device 3 and the desalination water tank 4 are successively connected through a pipeline from left to right; the seawater pretreatment device 2 selects a microfiltration device or microfiltration+ultrafiltration device according to seawater quality; the seawater desalination device 3 is connected with the nanofiltration recovery device 5 through a pipeline; the desalination water tank 4 is connected with the nanofiltration recovery device 5 through a pipeline, and the connecting pipeline between the desalination water tank 4 and the nanofiltration recovery device 5 is provided with an electric flushing water inlet valve 6; the nanofiltration recovery device 5 is connected with the raw water tank 1 through a pipeline; the connecting pipeline between the raw water tank 1 and the seawater pretreatment device 2 is provided with a booster pump 7, and the connecting pipeline between the seawater pretreatment device 2 and the seawater desalination device 3 is provided with a variable frequency medium pressure pump 8. The present invention realizes seawater desalination, can also reduce the operating pressure, reduces the cost and saves energy consumption.

Specifically, the seawater desalination device 3 comprises a first voltage-stabilized energy recovery device 31, a first circulating booster pump 32 and a seawater desalination membrane block 33 which are connected successively from left to right through a pipeline; the first voltage-stabilized energy recovery device 31 is connected with the variable frequency medium pressure pump 8 through a pipeline; the seawater desalination membrane block 33 is connected with the desalination water tank 4 through a pipeline; a first flushing pipe is installed on the first voltage-stabilized energy recovery device 31, and a first return regulating valve 34 and a first electric flushing valve 35 are installed successively on the first flushing pipe from left to right; the water inlet flow velocity in a membrane of the seawater desalination membrane block 33 is controlled at 0.15-0.25 m/s, and the recovery rate of the seawater desalination membrane block 33 is controlled as above 35%; the seawater desalination membrane block 33 is connected with the nanofiltration recovery device 5 through a pipeline, and the connecting pipeline between the seawater desalination membrane block 33 and the nanofiltration recovery device 5 is provided with a first concentrated water regulating valve 36.

Specifically, the nanofiltration recovery device 5 comprises a nanofiltration membrane block 51, a second circulating booster pump 52 and a second voltage-stabilized energy recovery device 53 which are connected successively from left to right through a pipeline; the nanofiltration membrane block 51 is connected with the raw water tank 1 through a pipeline; the second voltage-stabilized energy recovery device 53 is connected with the desalination water tank 4 through a first flushing water inlet pipe 9; the first flushing water inlet pipe 9 is provided with a first electric flushing water inlet valve 6; and a nanofiltration membrane of the nanofiltration membrane block 51 is selected from a low desalination and anti-pollution nanofiltration membrane. The flow rate ensures that the water inlet flow velocity in each membrane is controlled at 0.15-0.25 m/s, and the recovery rate of produced water is controlled at about 50%; a second flushing pipe is installed on the second voltage-stabilized energy recovery device 53, and a second electric flushing valve 54 and a second return regulating valve 55 are installed on the second flushing pipe successively from left to right; the seawater desalination membrane block 33 is connected with the second voltage-stabilized energy recovery device 53 through a pipeline; an extension pipe is installed on the nanofiltration membrane block 51; and a second concentrated water regulating valve 56 is installed on the extension pipe.

In the present embodiment, the first voltage-stabilized energy recovery device 31 and the second voltage-stabilized energy recovery device 53 have the same structure, both of which comprise a pressure tank 311, a return pipe 312 and a water outlet pipe 313. The top of the pressure tank 311 is provided with an automatic exhaust valve 314 and a pressure damper; a filter screen 315 is installed inside the pressure tank 311; an automatic blowdown valve 316 is installed at the bottom of the pressure tank 311; the return pipe 312 is installed at a water return end of the pressure tank 311; a water outlet pipe 313 is installed at a water outlet end; pressure switches 317 are installed on the return pipe 312 and the water outlet pipe 313; and a water return external discharge regulating valve 318 is installed on the return pipe 312.

The working process of the present invention is as follows:

The seawater is transported to the raw water tank 1, pressurized by the booster pump 7 and transported to the seawater pretreatment device 2; after purification, the seawater is pressurized by the variable frequency medium pressure pump 8 (3.0-3.5 MPa) into the seawater desalination device 3, and after being treated by the seawater desalination device 3, the produced water enters the desalination water tank 4, and the concentrated water enters the nanofiltration recovery device 5, wherein the concentrated water passes through the second voltage-stabilized energy recovery device 53 and is further pressurized into the nanofiltration membrane block 51 by the second circulating booster pump 52. The produced water from nanofiltration is returned to the raw water tank 1 and mixed with the seawater to reduce the osmotic pressure of the raw water and discharge the concentrated water outside.

Embodiment 2

Figure 2:
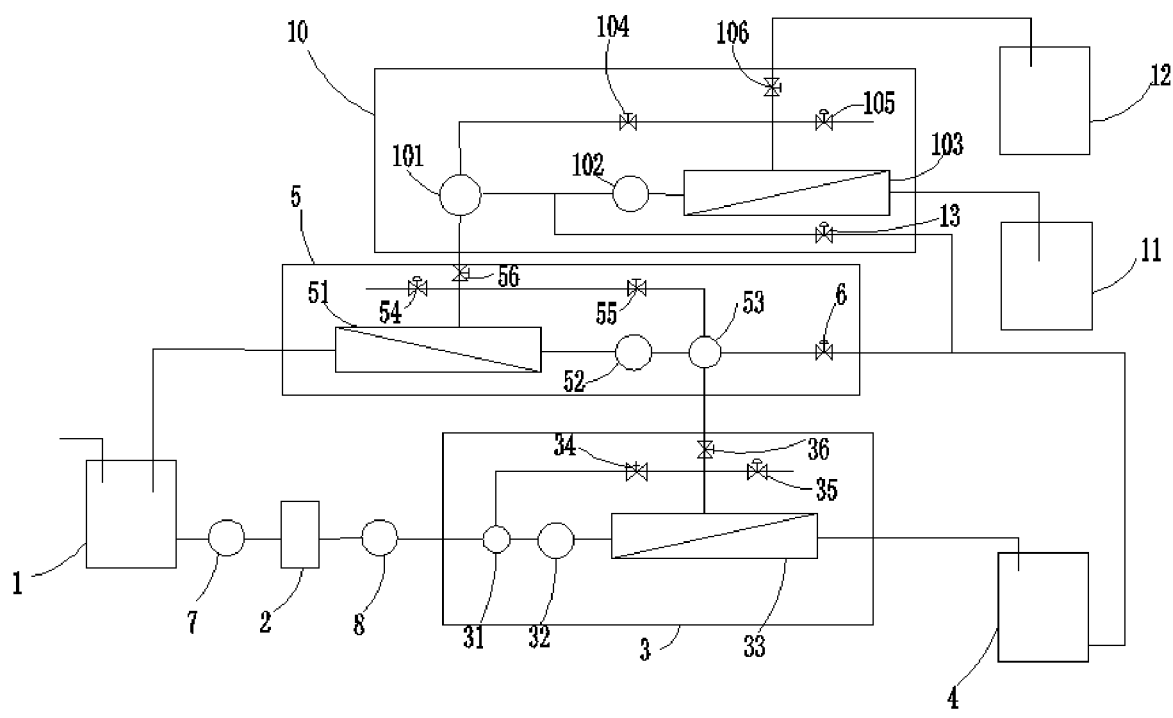
FIG. 2 is a structural schematic diagram of a seawater resourcezation system provided in embodiment 2 of the present invention.

As shown in FIGS. 2 and 6, an embodiment of the present invention discloses a seawater resourcezation system which comprises the above seawater desalination system, a salt separation nanofiltration device 10, a univalent concentrated brine tank 11 and a bivalent concentrated brine tank 12; the salt separation nanofiltration device 10 is connected with the nanofiltration recovery device 5 through a pipeline, and the salt separation nanofiltration device 10 is connected with the desalination water tank 4 through a pipeline; and the univalent concentrated brine tank 11 and the bivalent concentrated brine tank 12 are connected with the salt separation nanofiltration device 10 through a pipeline respectively. The present invention realizes seawater desalination and concentrated water resourcezation treatment for seawater, and at the same time, can reduce the operating pressure, reduce the cost and save energy consumption.

Specifically, the seawater desalination device 3 comprises a first voltage-stabilized energy recovery device 31, a first circulating booster pump 32 and a seawater desalination membrane block 33 which are connected successively from left to right through a pipeline; the first voltage-stabilized energy recovery device 31 is connected with the variable frequency medium pressure pump 8 through a pipeline; the seawater desalination membrane block 33 is connected with the desalination water tank 4 through a pipeline; the water inlet flow velocity in a membrane of the seawater desalination membrane block 33 is controlled at 0.15-0.25 m/s, and the recovery rate of the seawater desalination membrane block 33 is controlled as above 35%; a first flushing pipe is installed on the first voltage-stabilized energy recovery device 31, and a first return regulating valve 34 and a first electric flushing valve 35 are installed successively on the first flushing pipe from left to right; the seawater desalination membrane block 33 is connected with the nanofiltration recovery device 5 through a pipeline, and the connecting pipeline between the seawater desalination membrane block 33 and the nanofiltration recovery device 5 is provided with a first concentrated water regulating valve 36.

Specifically, the nanofiltration recovery device 5 comprises a nanofiltration membrane block 51, a second circulating booster pump 52 and a second voltage-stabilized energy recovery device 53 which are connected successively from left to right through a pipeline; the nanofiltration membrane block 51 is connected with the raw water tank 1 through a pipeline; and a nanofiltration membrane of the nanofiltration membrane block 51 is selected from a low desalination and anti-pollution nanofiltration membrane. The flow rate ensures that the water inlet flow velocity in each membrane is controlled at 0.15-0.25 m/s, and the recovery rate of produced water is controlled at about 50%. The second voltage-stabilized energy recovery device 53 is connected with the desalination water tank 4 through a first flushing water inlet pipe 9; the first flushing water inlet pipe 9 is provided with a first electric flushing water inlet valve 6; a second flushing pipe is installed on the second voltage-stabilized energy recovery device 53, and a second electric flushing valve 54 and a second return regulating valve 55 are installed on the second flushing pipe successively from left to right; the seawater desalination membrane block 33 is connected with the second voltage-stabilized energy recovery device 53 through a pipeline; an extension pipe is installed on the nanofiltration membrane block 51; and a second concentrated water regulating valve 56 is installed on the extension pipe.

Specifically, the salt separation nanofiltration device 10 comprises a third voltage-stabilized energy recovery device 101, a third circulating booster pump 102 and a salt separation nanofiltration membrane block 103 which are connected successively from left to right through a pipeline; the flow rate ensures that the water inlet flow velocity in each membrane is controlled at 0.15-0.25 m/s; the third voltage-stabilized energy recovery device 101 is connected with the nanofiltration membrane block 51 through the extension pipe; the connecting pipeline between the third voltage-stabilized energy recovery device 101 and the third circulating booster pump 102 is connected with the first flushing water inlet pipe 9 through a second flushing water inlet pipe; the second flushing water inlet pipe is provided with a second electric flushing water inlet valve 13; a third flushing pipe is installed on the third voltage-stabilized energy recovery device 101, and a third return regulating valve 104 and a third electric flushing valve 105 are installed on the third flushing pipe successively from left to right; the univalent concentrated brine tank 11 and the bivalent concentrated brine tank 12 are connected with the salt separation nanofiltration membrane block 103 respectively through a pipeline, and a third concentrated water regulating valve 106 is installed on the connecting pipeline between the bivalent concentrated brine tank 12 and the salt separation nanofiltration membrane block 103.

In the present embodiment, the first voltage-stabilized energy recovery device 31, the second voltage-stabilized energy recovery device 53 and the third voltage-stabilized energy recovery device 101 have the same structure, and comprise a pressure tank 311, a return pipe 312 and a water outlet pipe 313. The top of the pressure tank 311 is provided with an automatic exhaust valve 314 and a pressure damper; a filter screen 315 is installed inside the pressure tank 311; an automatic blowdown valve 316 is installed at the bottom of the pressure tank 311; the return pipe 312 is installed at the water return end of the pressure tank 311; a water outlet pipe 313 is installed at a water outlet end; pressure switches 317 are installed on the return pipe 312 and the water outlet pipe 313; and a water return external discharge regulating valve 318 is installed on the return pipe 312.

The Working Process of the Present Invention is as Follows:

The seawater is transported to the raw water tank 1, pressurized by the booster pump 7 and transported to the seawater pretreatment device 2; after purification, the seawater is pressurized by the variable frequency medium pressure pump 8 (3.0-3.5 MPa) into the seawater desalination device 3, and after being treated by the seawater desalination device 3, the produced water enters the desalination water tank 4, and the concentrated water enters the nanofiltration recovery device 5. Further, the concentrated water passes through the second voltage-stabilized energy recovery device 53 and is further pressurized into the nanofiltration membrane block 51 by the second circulating booster pump 52. The produced water from nanofiltration is returned to the raw water tank 1 and mixed with the seawater to reduce the osmotic pressure of the raw water. The concentrated water enters the salt separation nanofiltration device 10. Further, the concentrated water passes through the third voltage-stabilized energy recovery device 101 and is further pressurized into the salt separation nanofiltration membrane block 103 through the third circulating booster pump 102. The produced water enters the univalent concentrated brine tank 11 and the concentrated water enters the bivalent concentrated brine tank 12. The univalent concentrated brine is made into pure salt through sun exposure or MVR evaporation, and the bivalent concentrated brine is further processed into calcium sulfate, sodium sulfate, etc., to achieve zero discharge of seawater resources.

Embodiment 3

Figure 3:
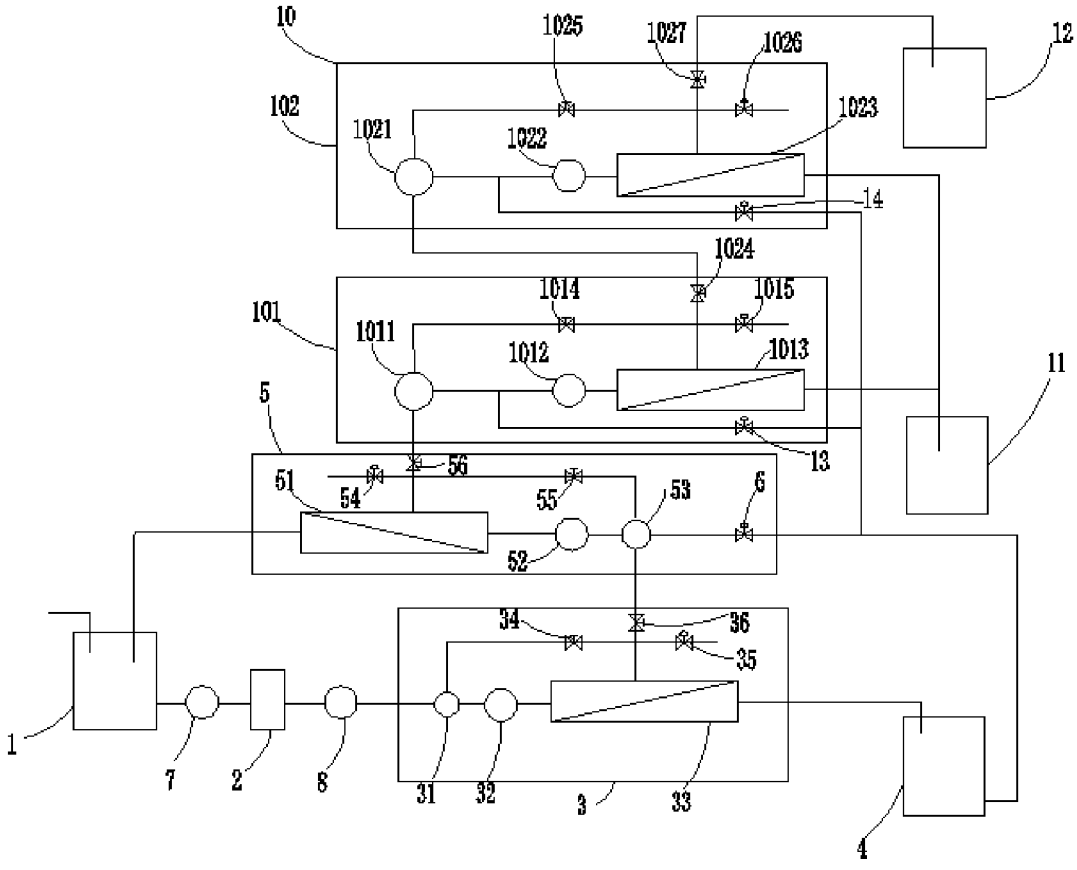
FIG. 3 is a structural schematic diagram of a seawater resourcezation system provided in embodiment 3 of the present invention.

As shown in FIGS. 3 and 6, an embodiment of the present invention discloses a seawater resourcezation system which comprises the above seawater desalination system, a salt separation nanofiltration device 10, a univalent concentrated brine tank 11 and a bivalent concentrated brine tank 12; the salt separation nanofiltration device 10 is connected with the nanofiltration recovery device 5 through a pipeline, and the salt separation nanofiltration device 10 is connected with the desalination water tank 4 through a pipeline; and the univalent concentrated brine tank 11 and the bivalent concentrated brine tank 12 are connected with the salt separation nanofiltration device 10 through a pipeline respectively. The present invention realizes seawater desalination and concentrated water resourcezation treatment for seawater, and at the same time, can reduce the operating pressure, reduce the cost and save energy consumption.

Specifically, the seawater desalination device 3 comprises a first voltage-stabilized energy recovery device 31, a first circulating booster pump 32 and a seawater desalination membrane block 33 which are connected successively from left to right through a pipeline; the first voltage-stabilized energy recovery device 31 is connected with the variable frequency medium pressure pump 8 through a pipeline; the seawater desalination membrane block 33 is connected with the desalination water tank 4 through a pipeline; the water inlet flow velocity in a membrane of the seawater desalination membrane block 33 is controlled at 0.15-0.25 m/s, and the recovery rate of the seawater desalination membrane block 33 is controlled as above 35%; a first flushing pipe is installed on the first voltage-stabilized energy recovery device 31, and a first return regulating valve 34 and a first electric flushing valve 35 are installed successively on the first flushing pipe from left to right; the seawater desalination membrane block 33 is connected with the nanofiltration recovery device 5 through a pipeline, and the connecting pipeline between the seawater desalination membrane block 33 and the nanofiltration recovery device 5 is provided with a first concentrated water regulating valve 36.

Specifically, the nanofiltration recovery device 5 comprises a nanofiltration membrane block 51, a second circulating booster pump 52 and a second voltage-stabilized energy recovery device 53 which are connected successively from left to right through a pipeline; the nanofiltration membrane block 51 is connected with the raw water tank 1 through a pipeline; and the water inlet flow velocity in a membrane is controlled at 0.15-0.25 m/s. The second voltage-stabilized energy recovery device 53 is connected with the desalination water tank 4 through a first flushing water inlet pipe 9; the first flushing water inlet pipe 9 is provided with a first electric flushing water inlet valve 6; a second flushing pipe is installed on the second voltage-stabilized energy recovery device 53, and a second electric flushing valve 54 and a second return regulating valve 55 are installed on the second flushing pipe successively from left to right; the seawater desalination membrane block 33 is connected with the second voltage-stabilized energy recovery device 53 through a pipeline; an extension pipe is installed on the nanofiltration membrane block 51; and a second concentrated water regulating valve 56 is installed on the extension pipe.

Specifically, the salt separation nanofiltration device 10 comprises a preliminary concentrated salt separation nanofiltration device 101 and a deep concentrated salt separation nanofiltration device 102.

The preliminary concentrated salt separation nanofiltration device 101 comprises a third voltage-stabilized energy recovery device 1011, a third circulating booster pump 1012 and a first salt separation nanofiltration membrane block 1013 which are connected successively from left to right through a pipeline; the water inlet flow velocity in a membrane of the first salt separation nanofiltration membrane block 1013 is controlled at 0.2-0.3 m/s; the third voltage-stabilized energy recovery device 1011 is connected with the nanofiltration membrane block 51 through the extension pipe; the connecting pipeline between the third voltage-stabilized energy recovery device 1011 and the third circulating booster pump 1012 is connected with the first flushing water inlet pipe 9 through the second flushing water inlet pipe; the second flushing water inlet pipe is provided with the second electric flushing water inlet valve 13; a third flushing pipe is installed on the third voltage-stabilized energy recovery device 1011, and a third return regulating valve 1014 and a third electric flushing valve 1015 are installed on the third flushing pipe successively from left to right; and the univalent concentrated brine tank 11 is connected with the first salt separation nanofiltration membrane block 1013 through a pipeline.

The deep concentrated salt separation nanofiltration device 102 comprises a fourth voltage-stabilized energy recovery device 1021, a fourth circulating booster pump 1022 and a second salt separation nanofiltration membrane block 1023 which are connected successively from left to right through a pipeline; the water inlet flow velocity in a membrane of the second salt separation nanofiltration membrane block 1023 is controlled at 0.2-0.3 m/s; the fourth voltage-stabilized energy recovery device 1021 is connected with the first salt separation nanofiltration membrane block 1013 through a pipeline; the third concentrated water regulating valve 1024 is installed on the connecting pipeline between the fourth voltage-stabilized energy recovery device 1021 and the first salt separation nanofiltration membrane block 1013; the connecting pipeline between the fourth voltage-stabilized energy recovery device 1021 and the fourth circulating booster pump 1022 is connected with the second flushing water inlet pipe through the third flushing water inlet pipe; the third flushing water inlet pipe is provided with a third electric flushing water inlet valve 14; a fourth flushing pipe is installed on the fourth voltage-stabilized energy recovery device 1021, and a fourth return regulating valve 1025 and a fourth electric flushing valve 1026 are installed on the fourth flushing pipe successively from left to right; the univalent concentrated brine tank 11 and the bivalent concentrated brine tank 12 are connected with the second salt separation nanofiltration membrane block 1023 respectively through a pipeline, and a fourth concentrated water regulating valve 1027 is installed on the connecting pipeline between the bivalent concentrated brine tank 12 and the second salt separation nanofiltration membrane block 1023.

In the present embodiment, the first voltage-stabilized energy recovery device 31, the second voltage-stabilized energy recovery device 53, the third voltage-stabilized energy recovery device 101 and the fourth voltage-stabilized energy recovery device 1021 have the same structure, and comprise a pressure tank 311, a return pipe 312 and a water outlet pipe 313. The top of the pressure tank 311 is provided with an automatic exhaust valve 314 and a pressure damper; a filter screen 315 is installed inside the pressure tank 311; an automatic blowdown valve 316 is installed at the bottom of the pressure tank 311; the return pipe 312 is installed at the water return end of the pressure tank 311; a water outlet pipe 313 is installed at a water outlet end; pressure switches 317 are installed on the return pipe 312 and the water outlet pipe 313; and a water return external discharge regulating valve 318 is installed on the return pipe 312.

The Working Process of the Present Invention is as Follows:

The seawater is transported to the raw water tank 1, pressurized by the booster pump 7 and transported to the seawater pretreatment device 2; after purification, the seawater is pressurized by the variable frequency medium pressure pump 8 (3.0-3.5 MPa) into the seawater desalination device 3, and after being treated by the seawater desalination device 3, the produced water enters the desalination water tank 4, and the concentrated water enters the nanofiltration recovery device 5. Specifically, the concentrated water passes through the second voltage-stabilized energy recovery device 53 and is further pressurized into the nanofiltration membrane block 51 by the second circulating booster pump 52. The produced water from nanofiltration is returned to the raw water tank 1 and mixed with the seawater to reduce the osmotic pressure of the raw water. The concentrated water passes through the third voltage-stabilized energy recovery device 1011 and is further pressurized into the first salt separation nanofiltration membrane block 1013 through the third circulating booster pump 1012. The water inlet flow velocity in a membrane is controlled at 0.2-0.3 m/s. The produced water enters the univalent concentrated brine tank 11, and the concentrated water passes through the fourth voltage-stabilized energy recovery device 1021 and is further pressurized into the second salt separation nanofiltration membrane block 1023 through the fourth circulating booster pump 1022. The water inlet flow velocity in the membrane is controlled at 0.2-0.3 m/s. The produced water enters the univalent concentrated brine tank 11 and the concentrated water enters the bivalent concentrated brine tank 12. The univalent concentrated brine is made into pure salt through sun exposure or MVR evaporation, and the bivalent concentrated brine is further processed into calcium sulfate, sodium sulfate, etc., to achieve zero discharge of seawater resources.

Embodiment 4

Figure 4:
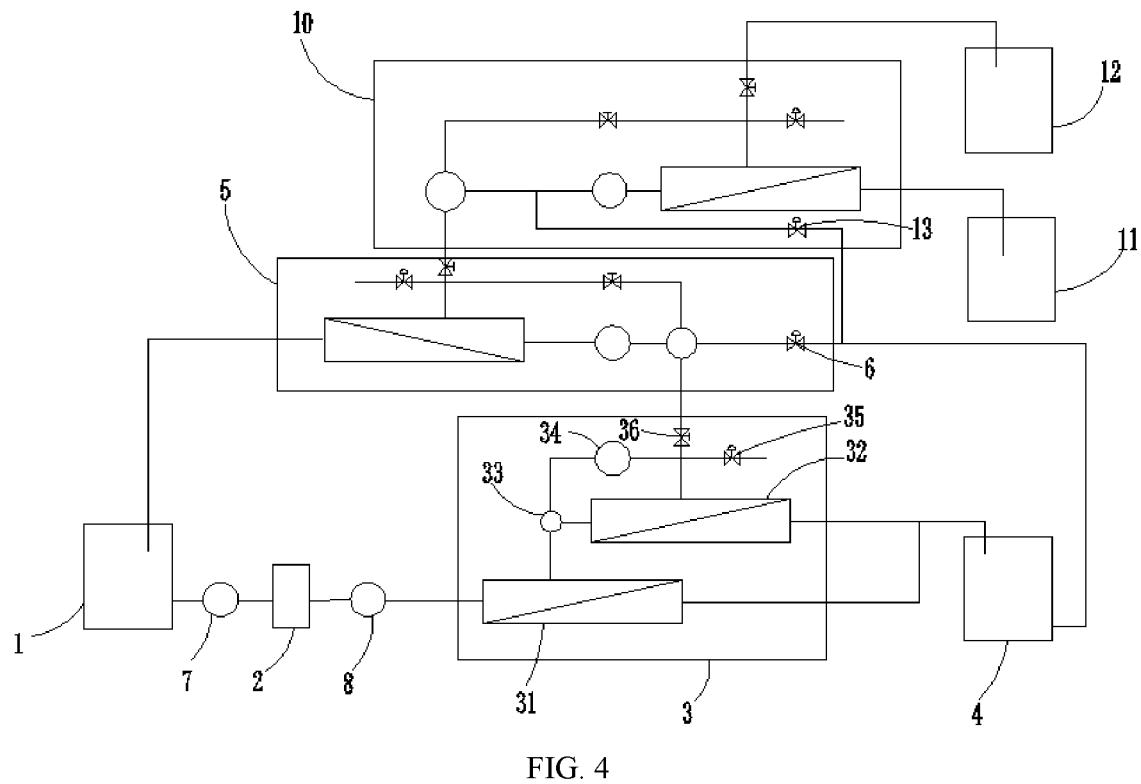
FIG. 4 is a structural schematic diagram of a seawater resourcezation system provided in embodiment 4 of the present invention.

As shown in FIGS. 4 and 6, an embodiment of the present invention discloses a seawater resourcezation system which comprises the above seawater desalination system, a salt separation nanofiltration device 10, a univalent concentrated brine tank 11 and a bivalent concentrated brine tank 12; the salt separation nanofiltration device 10 is connected with the nanofiltration recovery device 5 through a pipeline, and the salt separation nanofiltration device 10 is connected with the desalination water tank 4 through a pipeline; and the univalent concentrated brine tank 11 and the bivalent concentrated brine tank 12 are connected with the salt separation nanofiltration device 10 through a pipeline respectively. The present invention realizes seawater desalination and concentrated water resourcezation treatment for seawater, and at the same time, can reduce the operating pressure, reduce the cost and save energy consumption.

Specifically, the seawater desalination device 3 comprises a first seawater desalination membrane block 31, a second seawater desalination membrane block 32 and a first voltage-stabilized energy recovery device 33; the first seawater desalination membrane block 31 and the second seawater desalination membrane block 32 are connected through a pipeline; the first seawater desalination membrane block 31 is connected with the variable frequency medium pressure pump 8 through a pipeline; and the water inlet flow velocity in a membrane is controlled at 0.15-0.25 m/s. The first seawater desalination membrane block 31 and the second seawater desalination membrane block 32 are connected with the first voltage-stabilized energy recovery device 33 through a pipeline, and the first seawater desalination membrane block 31 and the second seawater desalination membrane block 32 are connected with the desalination water tank 4 through a pipeline; the first flushing pipe is installed on the first voltage-stabilized energy recovery device 33, and a first circulating booster pump 34 and a first electric flushing valve 35 are installed on the first flushing pipe successively from left to right; the second seawater desalination membrane block 31 is connected with the nanofiltration recovery device 5 through a pipeline, and the connecting pipeline between the second seawater desalination membrane block 32 and the nanofiltration recovery device 5 is provided with the first concentrated water regulating valve 36.

Specifically, the nanofiltration recovery device 5 comprises a nanofiltration membrane block 51, a second circulating booster pump 52 and a second voltage-stabilized energy recovery device 53 which are connected successively from left to right through a pipeline; the nanofiltration membrane block 51 is connected with the raw water tank 1 through a pipeline; and the water inlet flow velocity in a membrane is controlled at 0.15-0.25 m/s. The second voltage-stabilized energy recovery device 53 is connected with the desalination water tank 4 through a first flushing water inlet pipe 9; the first flushing water inlet pipe 9 is provided with a first electric flushing water inlet valve 6; a second flushing pipe is installed on the second voltage-stabilized energy recovery device 53, and a second electric flushing valve 54 and a second return regulating valve 55 are installed on the second flushing pipe successively from left to right; the seawater desalination membrane block 33 is connected with the second voltage-stabilized energy recovery device 53 through a pipeline; an extension pipe is installed on the nanofiltration membrane block 51; and a second concentrated water regulating valve 56 is installed on the extension pipe.

Specifically, the salt separation nanofiltration device 10 comprises a third voltage-stabilized energy recovery device 101, a third circulating booster pump 102 and a salt separation nanofiltration membrane block 103 which are connected successively from left to right through a pipeline; and the water inlet flow velocity in a membrane is controlled at 0.15-0.25 m/s; the third voltage-stabilized energy recovery device 101 is connected with the nanofiltration membrane block 51 through the extension pipe; the connecting pipeline between the third voltage-stabilized energy recovery device 101 and the third circulating booster pump 102 is connected with the first flushing water inlet pipe 9 through a second flushing water inlet pipe; the second flushing water inlet pipe is provided with a second electric flushing water inlet valve 13; a third flushing pipe is installed on the third voltage-stabilized energy recovery device 101, and a third return regulating valve 104 and a third electric flushing valve 105 are installed on the third flushing pipe successively from left to right; the univalent concentrated brine tank 11 and the bivalent concentrated brine tank 12 are connected with the salt separation nanofiltration membrane block 103 respectively through a pipeline, and a third concentrated water regulating valve 106 is installed on the connecting pipeline between the bivalent concentrated brine tank 12 and the salt separation nanofiltration membrane block 103.

In the present embodiment, the first voltage-stabilized energy recovery device 31, the second voltage-stabilized energy recovery device 53 and the third voltage-stabilized energy recovery device 101 have the same structure, and comprise a pressure tank 311, a return pipe 312 and a water outlet pipe 313. The top of the pressure tank 311 is provided with an automatic exhaust valve 314 and a pressure damper; a filter screen 315 is installed inside the pressure tank 311; an automatic blowdown valve 316 is installed at the bottom of the pressure tank 311; the return pipe 312 is installed at a water return end of the pressure tank 311; a water outlet pipe 313 is installed at a water outlet end; pressure switches 317 are installed on the return pipe 312 and the water outlet pipe 313; and a water return external discharge regulating valve 318 is installed on the return pipe 312.

The Working Process of the Present Invention is as Follows:

The seawater is transported to the raw water tank 1, pressurized by the booster pump 7 and transported to the seawater pretreatment device 2; after purification, the seawater is pressurized by the variable frequency medium pressure pump 8 (3.0-3.5 MPa) into the seawater desalination device 3, and after being treated by the first seawater desalination membrane block 31 and the second seawater desalination membrane block 32, the desalination effect is improved. The produced water enters the desalination water tank 4, and the concentrated water enters the nanofiltration recovery device 5. Further, the concentrated water passes through the second voltage-stabilized energy recovery device 53 and is further pressurized into the nanofiltration membrane block 51 by the second circulating booster pump 52. The produced water from nanofiltration is returned to the raw water tank 1 and mixed with the seawater to reduce the osmotic pressure of the raw water. The concentrated water enters the salt separation nanofiltration device 10. Further, the concentrated water passes through the third voltage-stabilized energy recovery device 101 and is further pressurized into the salt separation nanofiltration membrane block 103 through the third circulating booster pump 102. The produced water enters the univalent concentrated brine tank 11 and the concentrated water enters the bivalent concentrated brine tank 12. The univalent concentrated brine is made into pure salt through sun exposure or MVR evaporation, and the bivalent concentrated brine is further processed into calcium sulfate, sodium sulfate, etc., to achieve zero discharge of seawater resources.

Embodiment 5

Figure 5:
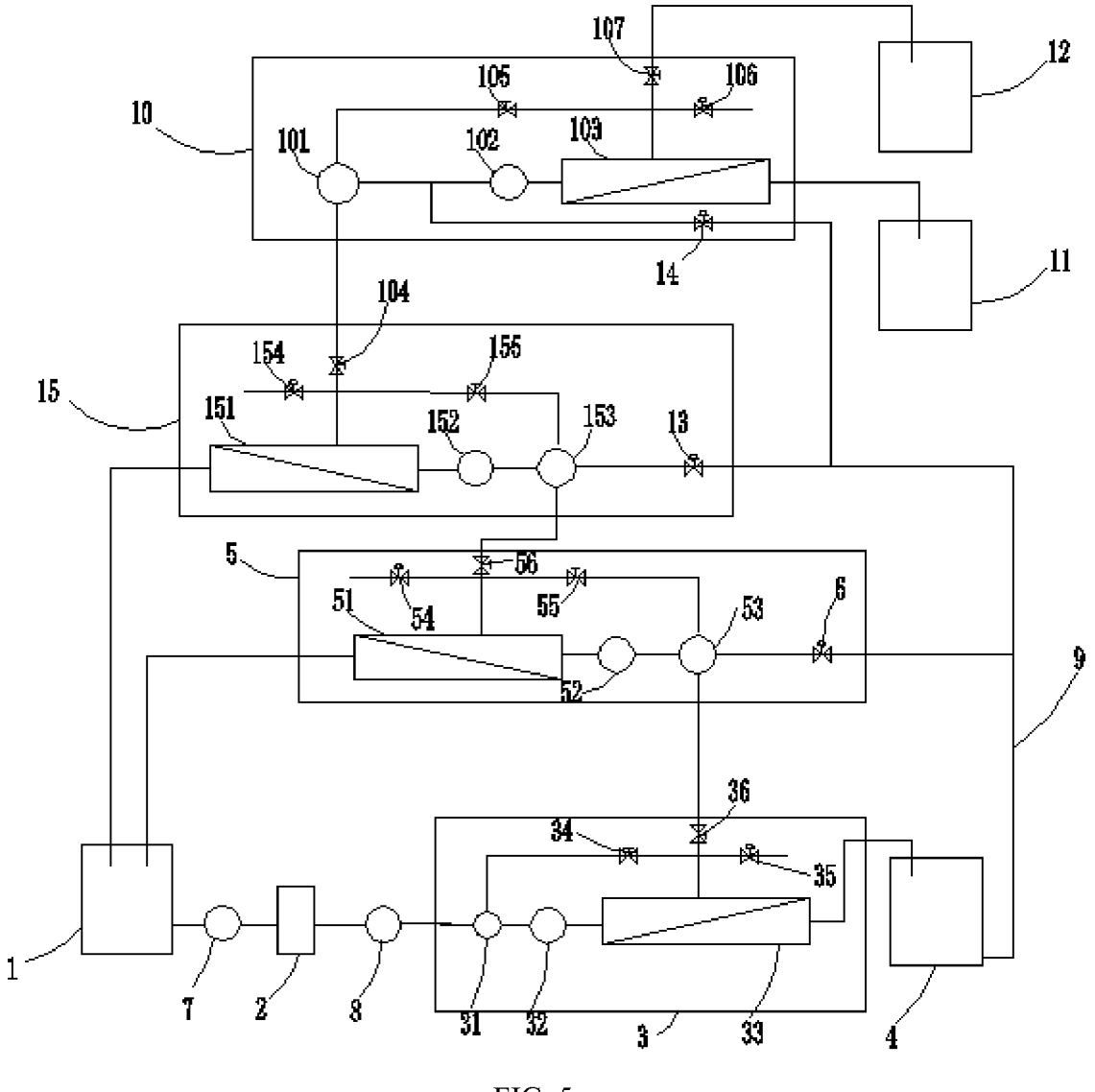
FIG. 5 is a structural schematic diagram of a seawater resourcezation system provided in embodiment 5 of the present invention.

As shown in FIGS. 5 and 6, an embodiment of the present invention discloses a seawater resourcezation system which comprises the above seawater desalination system, a salt separation nanofiltration device 10, a univalent concentrated brine tank 11, a bivalent concentrated brine tank 12 and a low desalination nanofiltration concentration recovery device 15; the salt separation nanofiltration device 10 is connected with the nanofiltration recovery device 5 through the low desalination nanofiltration concentration recovery device 15, and the salt separation nanofiltration device 10 is connected with the desalination water tank 4 through a pipeline; the low desalination nanofiltration concentration recovery device 15 is connected with the nanofiltration recovery device 5 through a pipeline, and the low desalination nanofiltration concentration recovery device 15 is connected with the raw water tank 1 and the desalination water tank 4 respectively through a pipeline; and the univalent concentrated brine tank 11 and the bivalent concentrated brine tank 12 are connected with the salt separation nanofiltration device 10 respectively through a pipeline. The present invention realizes seawater desalination and concentrated water resourcezation treatment for seawater, and at the same time, can reduce the operating pressure, reduce the cost and save energy consumption.

Specifically, the seawater desalination device 3 comprises a first voltage-stabilized energy recovery device 31, a first circulating booster pump 32 and a seawater desalination membrane block 33 which are connected successively from left to right through a pipeline; the first voltage-stabilized energy recovery device 31 is connected with the variable frequency medium pressure pump 8 through a pipeline; the seawater desalination membrane block 33 is connected with the desalination water tank 4 through a pipeline; a first flushing pipe is installed on the first voltage-stabilized energy recovery device 31, and a first return regulating valve 34 and a first electric flushing valve 35 are installed successively on the first flushing pipe from left to right; the water inlet flow velocity in a membrane of the seawater desalination membrane block 33 is controlled at 0.15-0.25 m/s, and the recovery rate of the seawater desalination membrane block 33 is controlled as above 35%; the seawater desalination membrane block 33 is connected with the nanofiltration recovery device 5 through a pipeline, and the connecting pipeline between the seawater desalination membrane block 33 and the nanofiltration recovery device 5 is provided with a first concentrated water regulating valve 36.

Specifically, the nanofiltration recovery device 5 comprises a nanofiltration membrane block 51, a second circulating booster pump 52 and a second voltage-stabilized energy recovery device 53 which are connected successively from left to right through a pipeline; the nanofiltration membrane block 51 is connected with the raw water tank 1 through a pipeline; and the water inlet flow velocity in a nanofiltration membrane is controlled at 0.20-0.25 m/s. The second voltage-stabilized energy recovery device 53 is connected with the desalination water tank 4 through a first flushing water inlet pipe 9; the first flushing water inlet pipe 9 is provided with a first electric flushing water inlet valve 6; a second flushing pipe is installed on the second voltage-stabilized energy recovery device 53, and a second electric flushing valve 54 and a second return regulating valve 55 are installed on the second flushing pipe successively from left to right; the seawater desalination membrane block 33 is connected with the second voltage-stabilized energy recovery device 53 through a pipeline; an extension pipe is installed on the nanofiltration membrane block 51; and a second concentrated water regulating valve 56 is installed on the extension pipe.

Specifically, the low desalination nanofiltration concentration recovery device 15 comprises a low desalination nanofiltration membrane block 151, a third circulating booster pump 152 and a third voltage-stabilized energy recovery device 153 which are connected successively from left to right through a pipeline, and the third voltage-stabilized energy recovery device 153 is connected with the nanofiltration membrane block 51 through the extension pipe; the third voltage-stabilized energy recovery device 153 is connected with the desalination water tank 4 through the second flushing water inlet pipe, and the second flushing water inlet pipe is communicated with the first flushing water inlet pipe 9; the second flushing water inlet pipe is provided with the second electric flushing water inlet valve 13; the third flushing pipe is installed on the third voltage-stabilized energy recovery device 153, and the third electric flushing valve 154 and the third return regulating valve 155 are installed on the third flushing pipe successively from left to right; the low desalination nanofiltration membrane block 151 is connected with the raw water tank 1 through a pipeline; and the water inlet flow velocity in a membrane is controlled at 0.20-0.25 m/s.

The salt separation nanofiltration device 10 comprises the fourth voltage-stabilized energy recovery device 101, the fourth circulating booster pump 102 and the salt separation nanofiltration membrane block 103 which are connected successively from left to right through a pipeline; the fourth voltage-stabilized energy recovery device 101 is connected with the low desalination nanofiltration membrane block 151 through a pipeline, and the connecting pipeline between the fourth voltage-stabilized energy recovery device 101 and the low desalination nanofiltration membrane block 151 is provided with the third concentrated water regulating valve 104; the connecting pipeline between the fourth voltage-stabilized energy recovery device 101 and the fourth circulating booster pump 102 is connected with the second flushing water inlet pipe through the third flushing water inlet pipe; the third flushing water inlet pipe is provided with the third electric flushing water inlet valve 14; the fourth flushing pipe is installed on the fourth voltage-stabilized energy recovery device 101, and a fourth return regulating valve 105 and a fourth electric flushing valve 106 are installed on the fourth flushing pipe successively from left to right; the univalent concentrated brine tank 11 and the bivalent concentrated brine tank 12 are connected with the salt separation nanofiltration membrane block 103 respectively through a pipeline, and the fourth concentrated water regulating valve 107 is installed on the connecting pipeline between the bivalent concentrated brine tank 12 and the second salt separation nanofiltration membrane block 1023; and the water inlet flow velocity in a membrane is controlled at 0.20-0.30 m/s.

In the present embodiment, the first voltage-stabilized energy recovery device 31, the second voltage-stabilized energy recovery device 53, the third voltage-stabilized energy recovery device 153 and the fourth voltage-stabilized energy recovery device 101 have the same structure, and comprise a pressure tank 311, a return pipe 312 and a water outlet pipe 313. The top of the pressure tank 311 is provided with an automatic exhaust valve 314 and a pressure damper; a filter screen 315 is installed inside the pressure tank 311; an automatic blowdown valve 316 is installed at the bottom of the pressure tank 311; the return pipe 312 is installed at a water return end of the pressure tank 311; a water outlet pipe 313 is installed at a water outlet end; pressure switches 317 are installed on the return pipe 312 and the water outlet pipe 313; and a water return external discharge regulating valve 318 is installed on the return pipe 312.

The Working Process of the Present Invention is as Follows:

The seawater is transported to the raw water tank 1, pressurized by the booster pump 7 and transported to the seawater pretreatment device 2; after purification, the seawater is pressurized by the variable frequency medium pressure pump 8 (2.5-3.0 MPa) into the seawater desalination device 3, and after being treated by the seawater desalination device 3, the produced water enters the desalination water tank 4, and the concentrated water enters the nanofiltration recovery device 5. Specifically, the concentrated water passes through the second voltage-stabilized energy recovery device 53 and is further pressurized into the nanofiltration membrane block 51 by the second circulating booster pump 52. The produced water from nanofiltration is returned to the raw water tank 1 and mixed with the seawater to reduce the osmotic pressure of the raw water. The concentrated water passes through the third voltage-stabilized energy recovery device 153 and is further pressurized into the low desalination nanofiltration membrane block 151 through the third circulating booster pump 152. The water inlet flow velocity in a membrane is controlled at 0.2-0.25 m/s. The produced water enters the raw water tank 1, and is mixed with the seawater to further reduce the osmotic pressure of the raw water. The concentrated water passes through the fourth voltage-stabilized energy recovery device 101 and is further pressurized into the salt separation nanofiltration membrane block 103 through the fourth circulating booster pump 102; and the water inlet flow velocity in the membrane is controlled at 0.2-0.3 m/s. The produced water enters the univalent concentrated brine tank 11 and the concentrated water enters the bivalent concentrated brine tank 12. The univalent concentrated brine is made into pure salt through sun exposure or MVR evaporation, and the bivalent concentrated brine is further processed into calcium sulfate, sodium sulfate, etc., to achieve zero discharge of seawater resources.

Each embodiment in the description is described in a progressive way. The difference of each embodiment from each other is the focus of explanation. The same and similar parts among all of the embodiments can be referred to each other. For the device disclosed by the embodiment, because the device corresponds to the method disclosed by the embodiment, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A seawater resourcezation system, comprising a seawater desalination system, a salt separation nanofiltration device, a univalent concentrated brine tank and a bivalent concentrated brine tank, wherein the seawater desalination system comprises a seawater replenishment pipeline, a raw water tank, a seawater pretreatment device, a seawater desalination device, a desalination water tank and a nanofiltration recovery device, wherein the raw water tank, the seawater pretreatment device, the seawater desalination device and the desalination water tank are successively connected through a pipeline from left to right; the seawater desalination device is connected with the nanofiltration recovery device through a pipeline; the desalination water tank is connected with the nanofiltration recovery device through a pipeline, and the connecting pipeline between the desalination water tank and the nanofiltration recovery device is provided with an electric flushing water inlet valve; and the nanofiltration recovery device is connected with the raw water tank through a pipeline, the salt separation nanofiltration device is connected with the nanofiltration recovery device through a pipeline, and the salt separation nanofiltration device is connected with the desalination water tank through a pipeline; and the univalent concentrated brine tank and the bivalent concentrated brine tank are connected with the salt separation nanofiltration device through a pipeline respectively, and the seawater desalination device comprises a first voltage-stabilized energy recovery device, a first circulating booster pump and a seawater desalination membrane block which are connected successively from left to right through a pipeline; the first voltage-stabilized energy recovery device is connected with the variable frequency medium pressure pump through a pipeline; the seawater desalination membrane block is connected with the desalination water tank through a pipeline; a first flushing pipe is installed on the first voltage-stabilized energy recovery device, and a first return regulating valve and a first electric flushing valve are installed successively on the first flushing pipe from left to right; the seawater desalination membrane block is connected with the nanofiltration recovery device through a pipeline, and the connecting pipeline between the seawater desalination membrane block and the nanofiltration recovery device is provided with a first concentrated water regulating valve.

2. The seawater resourcezation system according to claim 1, wherein the nanofiltration recovery device comprises a nanofiltration membrane block, a second circulating booster pump and a second voltage-stabilized energy recovery device which are connected successively from left to right through a pipeline; the nanofiltration membrane block is connected with the raw water tank through a pipeline; the second voltage-stabilized energy recovery device is connected with the desalination water tank through a first flushing water inlet pipe; the first flushing water inlet pipe is provided with a first electric flushing water inlet valve; a second flushing pipe is installed on the second voltage-stabilized energy recovery device, and a second electric flushing valve and a second return regulating valve are installed on the second flushing pipe successively from left to right; the seawater desalination membrane block is connected with the second voltage-stabilized energy recovery device through a pipeline; an extension pipe is installed on the nanofiltration membrane block; and a second concentrated water regulating valve is installed on the extension pipe.

3. The seawater resourcezation system according to claim 2, wherein the salt separation nanofiltration device comprises a third voltage-stabilized energy recovery device, a third circulating booster pump and a salt separation nanofiltration membrane block which are connected successively from left to right through a pipeline; the third voltage-stabilized energy recovery device is connected with the nanofiltration membrane block through the extension pipe; the connecting pipeline between the third voltage-stabilized energy recovery device and the third circulating booster pump is connected with the first flushing water inlet pipe through a second flushing water inlet pipe; the second flushing water inlet pipe is provided with a second electric flushing water inlet valve; a third flushing pipe is installed on the third voltage-stabilized energy recovery device, and a third return regulating valve and a third electric flushing valve are installed on the third flushing pipe successively from left to right; the univalent concentrated brine tank and the bivalent concentrated brine tank are connected with the salt separation nanofiltration membrane block respectively through a pipeline, and a third concentrated water regulating valve is installed on the connecting pipeline between the bivalent concentrated brine tank and the salt separation nanofiltration membrane block.

4. The seawater resourcezation system according to claim 2, wherein the salt separation nanofiltration device comprises a preliminary concentrated salt separation nanofiltration device and a secondary concentrated salt separation nanofiltration device; the preliminary concentrated salt separation nanofiltration device comprises a third voltage-stabilized energy recovery device, a third circulating booster pump and a first salt separation nanofiltration membrane block which are connected successively from left to right through a pipeline; the third voltage-stabilized energy recovery device is connected with the nanofiltration membrane block through the extension pipe; the connecting pipeline between the third voltage-stabilized energy recovery device and the third circulating booster pump is connected with the first flushing water inlet pipe through the second flushing water inlet pipe; the second flushing water inlet pipe is provided with the second electric flushing water inlet valve; a third flushing pipe is installed on the third voltage-stabilized energy recovery device, and a third return regulating valve and a third electric flushing valve are installed on the third flushing pipe successively from left to right; and the univalent concentrated brine tank is connected with the first salt separation nanofiltration membrane block through a pipeline;

the secondary concentrated salt separation nanofiltration device comprises a fourth voltage-stabilized energy recovery device, a fourth circulating booster pump and a second salt separation nanofiltration membrane block which are connected successively from left to right through a pipeline; the fourth voltage-stabilized energy recovery device is connected with the first salt separation nanofiltration membrane block through a pipeline; the third concentrated water regulating valve is installed on the connecting pipeline between the fourth voltage-stabilized energy recovery device and the first salt separation nanofiltration membrane block; the connecting pipeline between the fourth voltage-stabilized energy recovery device and the fourth circulating booster pump is connected with the second flushing water inlet pipe through the third flushing water inlet pipe; the third flushing water inlet pipe is provided with a third electric flushing water inlet valve; a fourth flushing pipe is installed on the fourth voltage-stabilized energy recovery device, and a fourth return regulating valve and a fourth electric flushing valve are installed on the fourth flushing pipe successively from left to right; the univalent concentrated brine tank and the bivalent concentrated brine tank are connected with the second salt separation nanofiltration membrane block respectively through a pipeline, and a fourth concentrated water regulating valve is installed on the connecting pipeline between the bivalent concentrated brine tank and the second salt separation nanofiltration membrane block.

5. The seawater resourcezation system according to claim 2, further comprising a desalination nanofiltration concentration recovery device, wherein the desalination nanofiltration concentration recovery device comprises a desalination nanofiltration membrane block, a third circulating booster pump and a third voltage-stabilized energy recovery device which are connected successively from left to right through a pipeline, and the third voltage-stabilized energy recovery device is connected with the nanofiltration membrane block through the extension pipe; the third voltage-stabilized energy recovery device is connected with the desalination water tank through the second flushing water inlet pipe, and the second flushing water inlet pipe is communicated with the first flushing water inlet pipe; the second flushing water inlet pipe is provided with the second electric flushing water inlet valve; the third flushing pipe is installed on the third voltage-stabilized energy recovery device, and the third electric flushing valve and the third return regulating valve are installed on the third flushing pipe successively from left to right; and the desalination nanofiltration membrane block is connected with the raw water tank through a pipeline;

the salt separation nanofiltration device comprises the fourth voltage-stabilized energy recovery device, the fourth circulating booster pump and the salt separation nanofiltration membrane block which are connected successively from left to right through a pipeline; the fourth voltage-stabilized energy recovery device is connected with the desalination nanofiltration membrane block through a pipeline, and the connecting pipeline between the fourth voltage-stabilized energy recovery device and the desalination nanofiltration membrane block is provided with the third concentrated water regulating valve; the connecting pipeline between the fourth voltage-stabilized energy recovery device and the fourth circulating booster pump is connected with the second flushing water inlet pipe through the third flushing water inlet pipe; the third flushing water inlet pipe is provided with the third electric flushing water inlet valve; the fourth flushing pipe is installed on the fourth voltage-stabilized energy recovery device, and a fourth return regulating valve and a fourth electric flushing valve are installed on the fourth flushing pipe successively from left to right; the univalent concentrated brine tank and the bivalent concentrated brine tank are connected with the salt separation nanofiltration membrane block respectively through a pipeline, and the fourth concentrated water regulating valve is installed on the connecting pipeline between the bivalent concentrated brine tank and the salt separation nanofiltration membrane block.

6. The seawater resourcezation system according to claim 1, wherein the seawater desalination device comprises a first seawater desalination membrane block, a second seawater desalination membrane block and the first voltage-stabilized energy recovery device; the first seawater desalination membrane block and the second seawater desalination membrane block are connected through a pipeline; the first seawater desalination membrane block is connected with the variable frequency medium pressure pump through a pipeline; the first seawater desalination membrane block and the second seawater desalination membrane block are connected with the first voltage-stabilized energy recovery device through a pipeline, and the first seawater desalination membrane block and the second seawater desalination membrane block are connected with the desalination water tank through a pipeline; the first flushing pipe is installed on the first voltage-stabilized energy recovery device, and a first circulating booster pump and a first electric flushing valve are installed on the first flushing pipe successively from left to right; the second seawater desalination membrane block is connected with the nanofiltration recovery device through a pipeline, and the connecting pipeline between the second seawater desalination membrane block and the nanofiltration recovery device is provided with the first concentrated water regulating valve.

7. The seawater resourcezation system according to claim 1, wherein the connecting pipeline between the raw water tank and the seawater pretreatment device is provided with a booster pump, and the connecting pipeline between the seawater pretreatment device and the seawater desalination device is provided with a variable frequency medium pressure pump.

\* \* \* \* \*